(12) United States Patent
Moriya et al.

(10) Patent No.: US 12,065,122 B2
(45) Date of Patent: Aug. 20, 2024

(54) ELECTRIC VEHICLE

(71) Applicant: SUBARU CORPORATION, Tokyo (JP)

(72) Inventors: Fumiyuki Moriya, Tokyo (JP); Atsushi Doki, Tokyo (JP); Hirofumi Yabe, Tokyo (JP); Takumi Hoshi, Tokyo (JP); Masaki Komuro, Tokyo (JP); Tetsu Matsuzaki, Tokyo (JP); Jun Oosawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 518 days.

(21) Appl. No.: 17/379,301

(22) Filed: Jul. 19, 2021

(65) Prior Publication Data
US 2022/0032897 A1 Feb. 3, 2022

(30) Foreign Application Priority Data
Jul. 30, 2020 (JP) ................. 2020-128754

(51) Int. Cl.
*B60W 20/00* (2016.01)
*B60K 6/24* (2007.10)
(Continued)

(52) U.S. Cl.
CPC ............. *B60W 20/00* (2013.01); *B60K 6/24* (2013.01); *B60K 6/26* (2013.01); *B60K 6/543* (2013.01);
(Continued)

(58) Field of Classification Search
CPC ........... B60W 20/00; B60W 30/18009; B60W 30/18172; B60W 30/182; B60W 50/00;
(Continued)

(56) References Cited

U.S. PATENT DOCUMENTS 7,247,115 B2 * 7/2007 Pelchen ................ F16H 61/702
477/107
7,302,333 B2 * 11/2007 Steen ................... B60K 28/165
701/87
(Continued)

FOREIGN PATENT DOCUMENTS

JP 2007-502234 A 2/2007
JP 2007-313947 A 12/2007
(Continued)

OTHER PUBLICATIONS

Office Action issued in corresponding Japanese Application No. 2020-128754, dated Dec. 5, 2023 w/English Translation.

*Primary Examiner* — Jason Holloway
*Assistant Examiner* — Madison B Emmett
(74) *Attorney, Agent, or Firm* — Rimon P.C.

(57) ABSTRACT

An electric vehicle includes a vehicle controller. The vehicle controller is capable of switching a traveling mode of the electric vehicle between a first traveling mode and a second traveling mode that applies driving-force maps for enhancing a rough-road capability from a rough-road capability in the first traveling mode. The vehicle controller is capable of switching the traveling mode to the second traveling mode in forward traveling and in backward traveling and is configured to apply, to the backward traveling in the second traveling mode, a first driving-force map of the driving-force maps, the first driving-force map having gentler characteristics than a second driving-force map of the driving-force map applied to the forward traveling in the second traveling mode.

6 Claims, 7 Drawing Sheets

(51) Int. Cl.
*B60K 6/26* (2007.10)
*B60K 6/543* (2007.10)
*B60W 30/18* (2012.01)
*B60W 30/182* (2020.01)
*B60W 50/00* (2006.01)

(52) U.S. Cl.
CPC ............ *B60W 30/18009* (2013.01); *B60W 30/18172* (2013.01); *B60W 30/182* (2013.01); *B60W 50/00* (2013.01); *B60W 2050/0026* (2013.01); *B60W 2520/06* (2013.01); *B60W 2552/35* (2020.02); *B60W 2720/26* (2013.01); *B60Y 2200/92* (2013.01); *B60Y 2300/18008* (2013.01); *B60Y 2300/18175* (2013.01); *B60Y 2300/182* (2013.01)

(58) Field of Classification Search
CPC ..... B60W 2050/0026; B60W 2520/06; B60W 2552/35; B60W 2720/26; B60W 2710/085; B60W 30/18036; B60W 20/15; B60W 30/188; B60W 2050/0042; B60W 2540/16; B60W 2540/215; B60K 6/24; B60K 6/26; B60K 6/543; B60K 6/387; B60K 2006/4825; B60K 6/48; B60Y 2200/92; B60Y 2300/18008; B60Y 2300/18175; B60Y 2300/182; Y02T 10/72; Y02T 10/62

See application file for complete search history.

(56) References Cited

U.S. PATENT DOCUMENTS

| | | | |
|---|---|---|---|
| 2002/0095248 A1* | 7/2002 | Katakura | F02D 41/0225 701/34.4 |
| 2005/0035601 A1 | 2/2005 | Dyck et al. | |
| 2007/0276549 A1 | 11/2007 | Hijikata | |
| 2010/0275713 A1* | 11/2010 | Penttila | B62K 5/01 74/473.3 |
| 2013/0124026 A1 | 5/2013 | Ueno et al. | |
| 2014/0372005 A1* | 12/2014 | Darnell | F02D 41/2422 701/70 |
| 2016/0185350 A1* | 6/2016 | Kelly | B60W 10/04 701/94 |
| 2016/0185351 A1* | 6/2016 | Jerger | F16H 61/0204 701/56 |
| 2019/0135262 A1* | 5/2019 | Gaither | B60W 20/10 |
| 2020/0079373 A1* | 3/2020 | Ortmann | B60W 10/08 |
| 2020/0217405 A1* | 7/2020 | Dumas | F16H 48/22 |
| 2021/0229654 A1* | 7/2021 | Matsubara | B60L 15/20 |

FOREIGN PATENT DOCUMENTS

| | | |
|---|---|---|
| JP | 2010-163090 A | 7/2010 |
| JP | 2012-041038 A | 3/2012 |
| JP | 2012-066747 A | 4/2012 |
| JP | 2012-086761 A | 5/2012 |
| JP | 2015-202790 A | 11/2015 |
| JP | 2015-202815 A | 11/2015 |

* cited by examiner

ELECTRIC VEHICLE

CROSS-REFERENCE TO RELATED APPLICATIONS

The present application claims priority from Japanese Patent Application No. 2020-128754 filed on Jul. 30, 2020, the entire contents of which are hereby incorporated by reference.

BACKGROUND

The disclosure relates to an electric vehicle having a traveling mode for enhancing a rough-road capability.

Japanese Unexamined Patent Application Publication No. 2012-66747 discloses an electric vehicle. The electric vehicle includes an off-road selection switch for switching a traveling mode to a mode suitable for a rough road, a low-speed four-wheel drive selection switch for switching the traveling mode from two-wheel drive to low-speed four-wheel drive, and a select lever of transmission for switching between reverse (backward traveling) and drive (forward traveling).

SUMMARY

An aspect of the disclosure provides an electric vehicle including a vehicle controller. The vehicle controller is capable of switching a traveling mode of the electric vehicle between a first traveling mode and a second traveling mode that applies driving-force maps for enhancing a rough-road capability from a rough-road capability in the first traveling mode. The vehicle controller is capable of switching the traveling mode to the second traveling mode in forward traveling and in backward traveling. The vehicle controller is configured to apply, to the backward traveling in the second traveling mode, a first driving-force map of the driving-force maps. The first driving-force map has gentler characteristics than a second driving-force map of the driving-force maps, the second driving-force map being applied to the forward traveling in the second traveling mode.

An aspect of the disclosure provides an electric vehicle including circuitry. The circuitry is capable of switching a traveling mode of the electric vehicle between a first traveling mode and a second traveling mode that applies driving-force maps for enhancing a rough-road capability from a rough-road capability in the first traveling mode is applied. The circuitry is capable of switching the traveling mode to the second traveling mode in forward traveling and in backward traveling. The circuitry is configured to apply, to the backward traveling in the second traveling mode, a first driving-force map of the driving-force maps. the first driving-force map has gentler characteristics than a second driving-force map of the second of the driving-force maps, the second driving-force map being applied to the forward traveling in the second traveling mode.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 4 is a timing chart of an operation performed when a mode A and a mode B are switched between;

DETAILED DESCRIPTION

For example, when a driver attempts to get a vehicle out of deep snow or mud, the driver presumably switches between forward traveling and backward traveling many times. In electric vehicles of the related art, however, a traveling mode for enhancing a rough-road capability is applied to forward traveling alone and is not applied to backward traveling. On the other hand, it tunes out that good traveling characteristics for enhancing the rough-road capability are not obtained in backward traveling if a traveling mode that enhances the rough-road capability and that has the same characteristics is applied to both of forward traveling and backward traveling.

It is desirable to provide an electric vehicle that implements good traveling characteristics also in backward traveling in a traveling mode for enhancing a rough-road capability.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
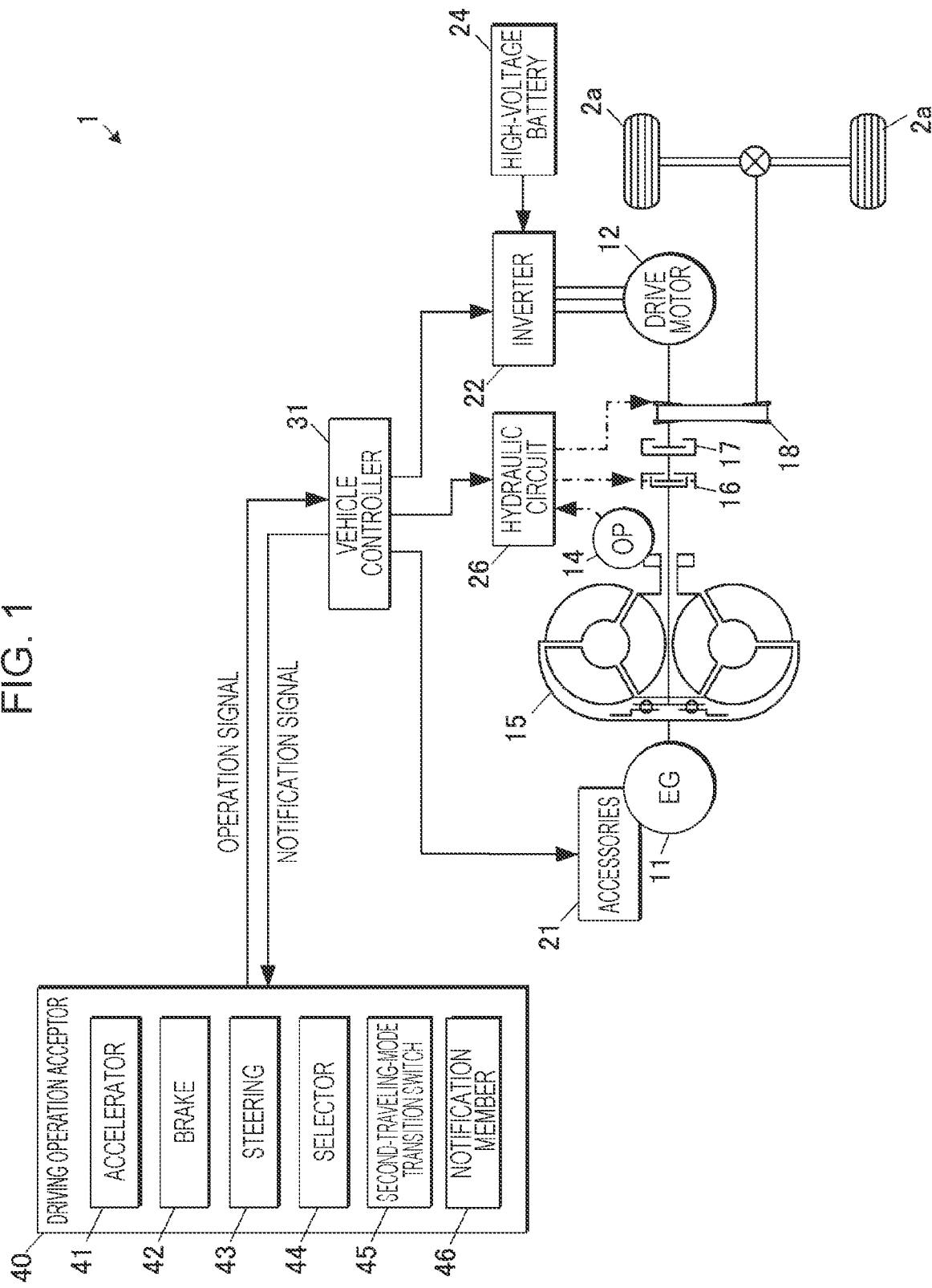
FIG. 1 is a block diagram illustrating an electric vehicle according to an embodiment of the disclosure.

FIG. 1 is a block diagram illustrating an electric vehicle according to the embodiment of the disclosure.

An electric vehicle 1 according to the embodiment of the disclosure is a hybrid electric vehicle (HEV). The electric vehicle 1 includes driving wheels 2a, an engine 11, a drive motor 12, a pump 14, a torque converter 15, a shift mechanism 16, an input clutch 17, and a continuously variable transmission 18. The engine 11 is an internal combustion engine. The drive motor 12 is an electric motor. The pump 14, which is mechanical, uses part of power generated by the engine 11 to apply pressure to hydraulic oil. The torque converter 15 is located in a torque transfer path from the engine 11 to the driving wheels 2a. The drive motor 12 is disposed such that power is transferred to the driving wheels 2a not via the torque converter 15, the shift mechanism 16, and the input clutch 17 but via the continuously variable transmission 18. The electric vehicle 1 may include, in addition to the pump 14, an electrical pump that applies pressure to hydraulic oil.

The shift mechanism 16 is capable of converting power generated by the engine 11 to generate rotation for forward traveling (drive mode) or rotation for backward traveling (reverse mode) in a switching manner and of outputting the power to the continuously variable transmission 18. In accordance with switching control performed by a hydraulic circuit 26, the shift mechanism 16 is switched by using, as power, the pressure applied to the hydraulic oil by the pump 14.

The continuously variable transmission 18 is capable of transferring power transmitted from one of pulleys to the other pulley via a belt and of changing a gear ratio by changing widths in the pulleys by using the hydraulic oil. The continuously variable transmission 18 has a function of suppressing slipping of the belt by changing the widths in the respective pulleys using the hydraulic oil to apply tension to the belt. The same hydraulic oil as the hydraulic oil used for switching the shift mechanism 16 is used in the continuously variable transmission 18 to change the widths in the pulleys.

The electric vehicle 1 further includes accessories 21, an inverter 22, an high-voltage battery 24, the hydraulic circuit 26, a vehicle controller 31, and a driving operation acceptor 40. The accessories 21 are for driving the engine 11. The inverter 22 drives the drive motor 12. The high-voltage battery 24 supplies the drive motor 12 with electric power for use in traveling. The hydraulic circuit 26 drives drive the shift mechanism 16 and the continuously variable transmission by using the hydraulic oil. The vehicle controller 31 controls the accessories 21, the inverter 22, and the hydraulic circuit 26. The driving operation acceptor 40 is operable by a driver. The driving operation acceptor 40 includes an accelerator 41, a brake 42, a steering 43, a selector 44, a second-traveling-mode transition switch 45, and a notification member 46. The second-traveling-mode transition switch 45 is used for switching the traveling mode. The notification member outputs notification information such as notifying sound and notifying indication to the driver. An operation signal indicating an operation amount of the accelerator 41 and an operation signal of the second-traveling-mode transition switch are sent to the vehicle controller 31. The vehicle controller 31 is capable of outputting notification information to the notification member 46.

The vehicle controller 31 includes a single electronic control unit (ECU) or a plurality of ECUs that operate in cooperation with each other. As a result of a central processing unit (CPU) of the ECU(s) executing a control program, the vehicle controller 31 controls operations of the engine 11, the drive motor 12, and the hydraulic circuit 26 in accordance with the operation signals sent from the driving operation acceptor 40 and states of the respective components of the electric vehicle 1.

The vehicle controller 31 is capable of switching a traveling mode of the electric vehicle 1 between a first traveling mode and a second traveling mode for enhancing a rough-road capability from a rough-road capability in the first traveling mode. The first traveling mode is a traveling mode suitable for a vehicle to travel on a normal paved road without snow or mud. In one example, the first traveling mode may be a normal traveling mode, an intelligence traveling mode in which power output characteristics in response to an accelerator operation is gentler than those in the normal traveling mode, or a sport mode in which power output characteristics in response to an accelerator operation is sharper than those in the normal traveling mode.

The second traveling mode is a traveling mode suitable for a vehicle to run on a rough road such as a snow-covered road, a muddy road, or a gravel road. In the second traveling mode, a driving-force map in which the rough-road capability is enhanced from the rough-road capability of the first traveling mode is applied. The driving-force map indicates a map of power output characteristics in response to an accelerator operation. The second traveling mode includes two sub-modes, which are a mode A (hereinafter also referred to as a second traveling mode A) and a mode B (hereinafter also referred to as a second traveling mode B). In the mode A, wheelspin of the driving wheels 2a is permitted to get the vehicle out of deep snow or mud. In the mode B, the vehicle travels while suppressing wheelspin of the driving wheels 2a on a rough road. The driving-force map applied in the mode A may be different from the driving-force map applied in the mode B. For example, the driving-force map applied in the mode A may be a driving-force map with which large power is more easily output at low speed than with the driving-force map applied in the first traveling mode. The driving-force map applied in the mode B may be a driving-force map with which smaller power is output at low speed even in response to a large accelerator operation than with the driving-force map applied in the first traveling mode. To improve the rough-road capability, parameters of traction control, a control method of a braking device, the number of driving wheels 2a, and a method of distributing power to the individual driving wheels 2a in addition to the driving-force map may be changed in the second traveling mode from those used in the first traveling mode. In the first traveling mode, all of traveling by driving of the engine 11 alone, traveling by driving of the drive motor 12 alone, and traveling by driving of the engine 11 and the drive motor 12 are permitted. However, in the second traveling mode, the engine 11 is driven all the time. Thus, traveling by driving of the engine 11 alone and traveling by driving of both the engine 11 and the drive motor 12 are permitted. Further, the first traveling mode is a traveling mode without any limit on the vehicle speed. The second traveling mode may be a mode that is selectable when the vehicle speed is low, for example, 40 km/h or lower.

Figure 2A:
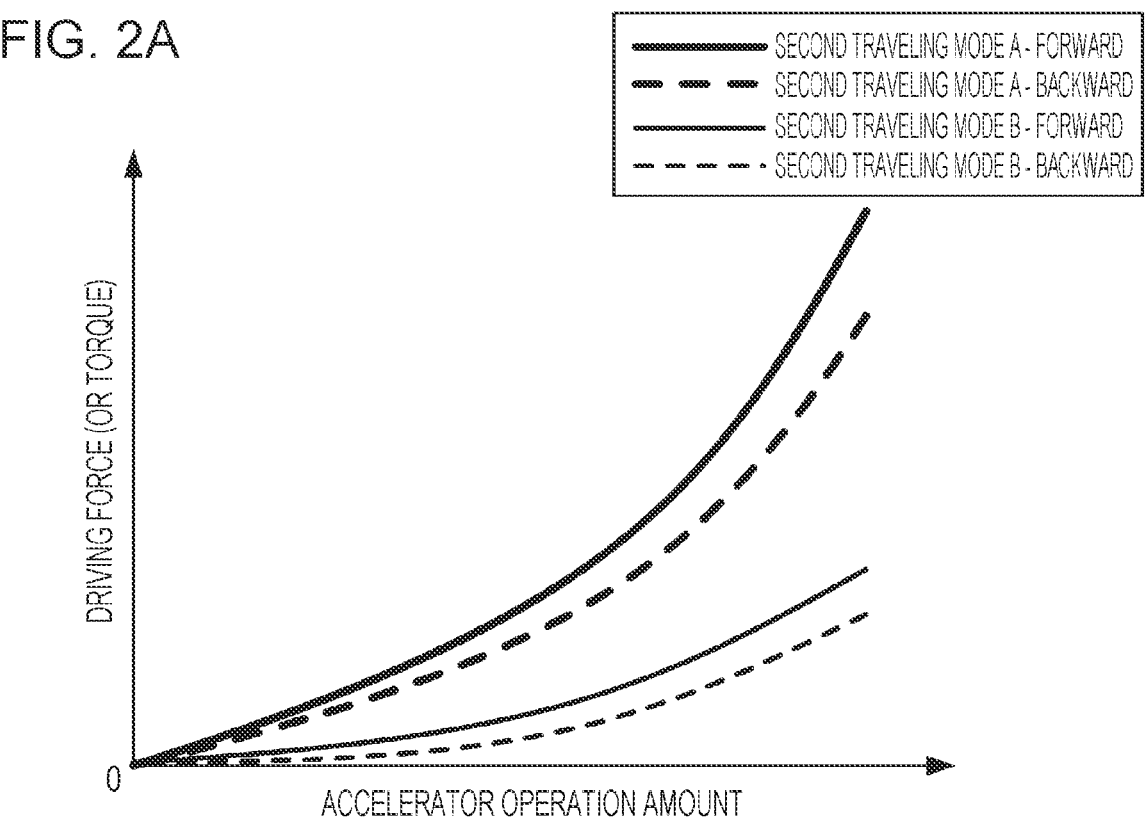
FIG. 2A illustrates driving-force maps depicting characteristics applied to forward traveling and backward traveling in a second traveling mode.
Figure 2B:
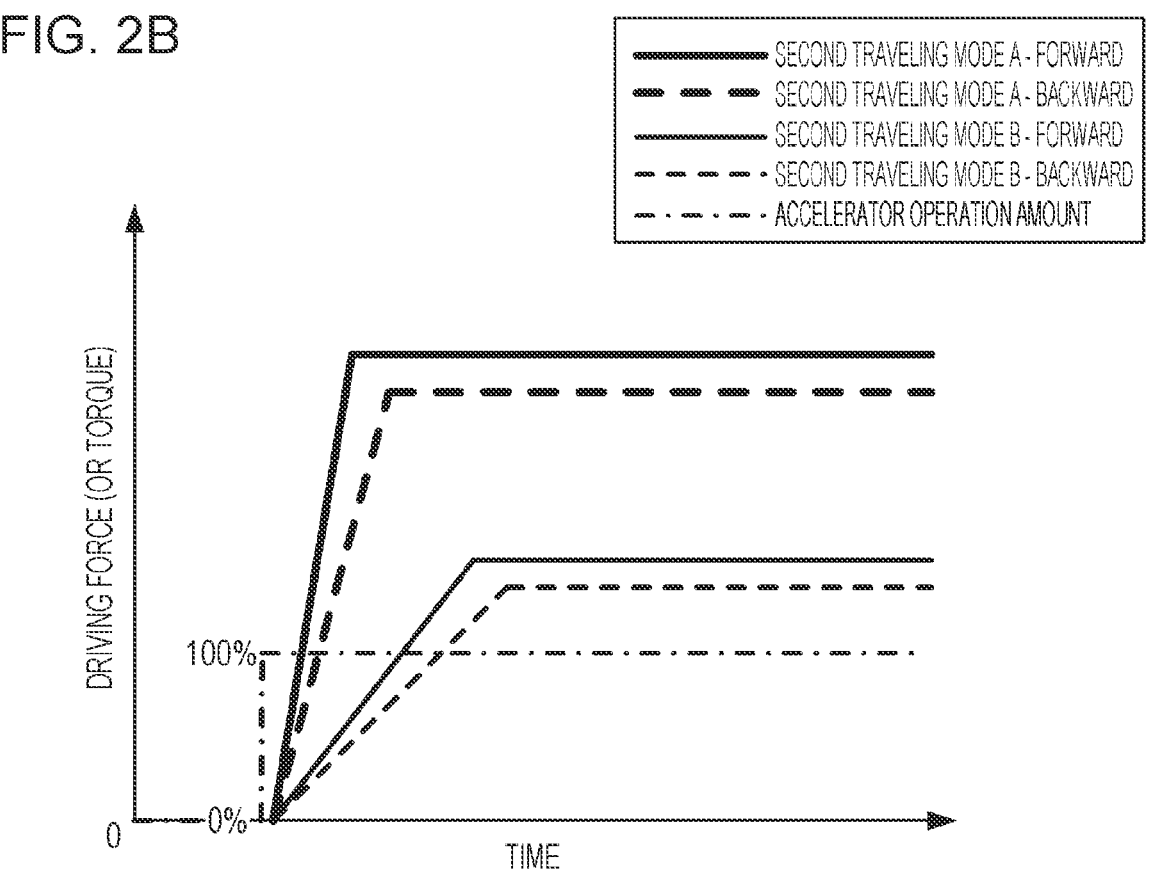
FIG. 2B is a timing chart depicting response characteristics for forward traveling and backward traveling in the second traveling mode.

Characteristics of Forward Traveling and Backward Traveling in Second Traveling Mode FIG. 2A illustrates driving-force maps depicting characteristics applied to forward traveling and backward traveling in the second traveling mode. FIG. 2B is a timing chart depicting response characteristics for forward traveling and backward traveling in the second traveling mode.

The vehicle controller 31 is capable of switching the traveling mode to the second traveling mode both in forward traveling and in backward traveling. The vehicle controller 31 switches the driving-force map and the output power responsivity between those applied to forward traveling in the second traveling mode and those applied to backward traveling in the second traveling mode as illustrated in FIGS. 2A and 2B.

As illustrated in FIG. 2A, the driving-force map applied to backward traveling in the second traveling mode has gentler characteristics than the driving-force map applied to forward traveling in the second traveling mode. The driving-force map applied to backward traveling has gentler characteristics than the driving-force map applied to forward traveling as indicated by comparison of the driving-force maps applied in the mode A and by comparison of the driving-force maps applied in the mode B. Gentler characteristics of the driving-force map indicate that power to be output in response to an accelerator operation of the same operation amount is smaller and that an increase rate of power to be output in response to a gradual increase in an accelerator operation at a predetermined gradient is smaller.

As illustrated in FIG. 2B, the responsivity of power to be output in backward traveling in the second traveling mode is slower than the responsivity of power to be output in forward traveling in the second traveling mode. The responsivity in backward traveling is slower than the responsivity in forward traveling as indicated by comparison of the responsivities in the mode A and by comparison of the responsivities in the mode B. A slower responsivity indicates that an increase rate of power in response to a hard operation on the accelerator 41 is smaller.

As described above, as a result of power output characteristics in the second traveling mode becoming gentler in backward traveling than in forward traveling, good traveling characteristics may be provided when a vehicle runs on a rough road in the second traveling mode while switching between forward traveling and backward traveling. The visibility of the driver impairs in backward driving compared with forward traveling. As a result, the driver may find it difficult to drive because the driver moves their sight in the rear direction and is consequently in an uncomfortable position for driving. Thus, a careful accelerator operation is difficult in backward traveling. A gentle driving-force map is applied for a less careful accelerator operation in backward traveling, whereas a sharp driving-force map is applied for a careful accelerator operation in forward traveling. In this manner, the power to be output in response to an accelerator operation is attempted to be equalized in forward traveling and in backward traveling.

As a result, good traveling characteristics described above are successfully provided.

Mode-A Mode-B Switching Process

Figure 3:
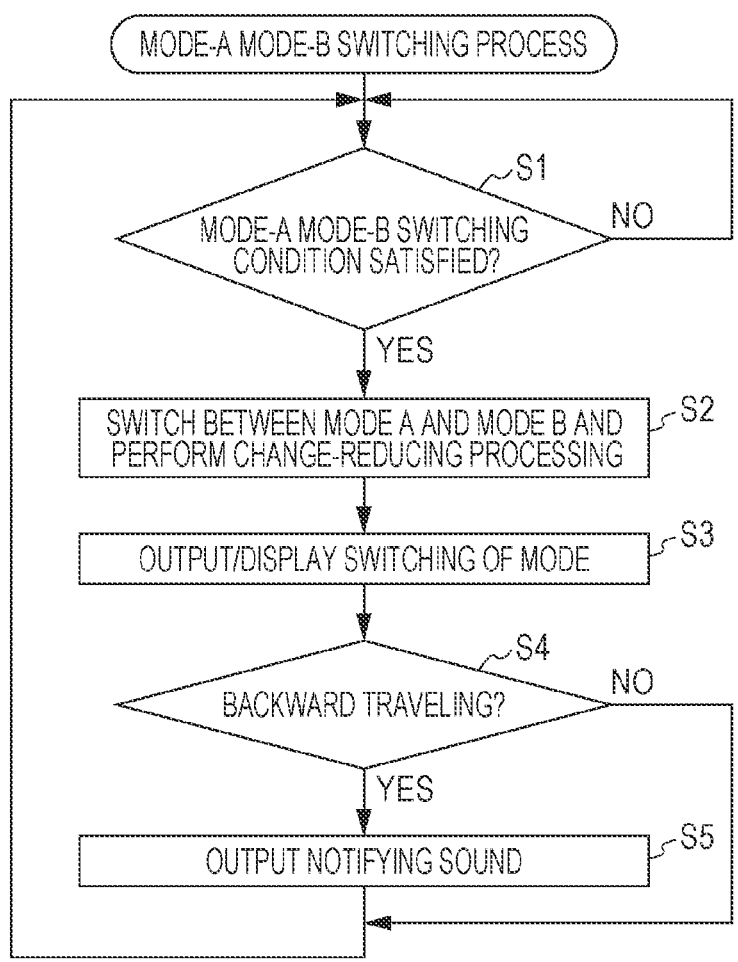
FIG. 3 is a flowchart illustrating a mode-A mode-B switching process performed by a vehicle controller.
Figure 4:
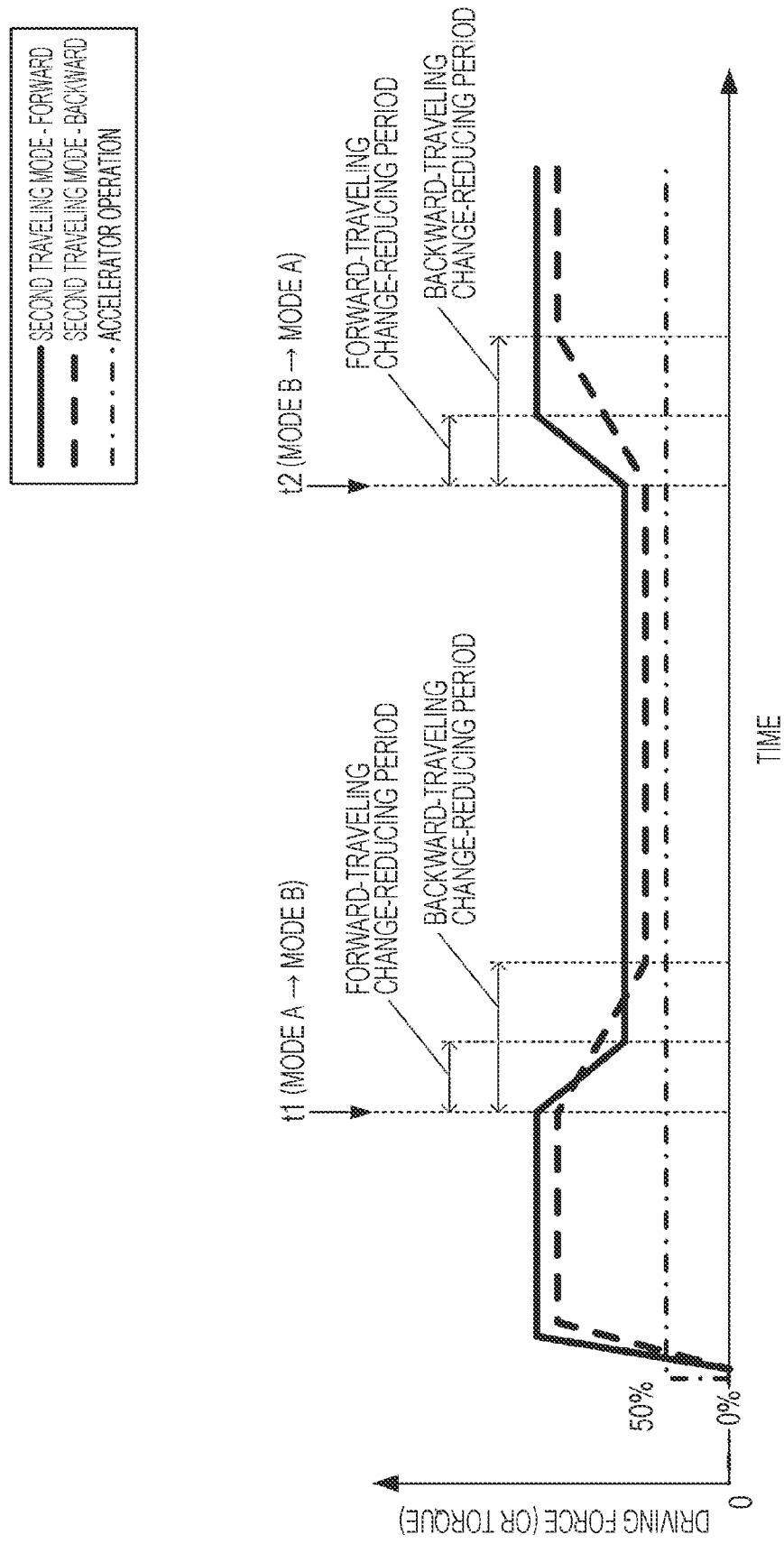

FIG. 3 is a flowchart illustrating a mode-A mode-B switching process performed by the vehicle controller. FIG. 4 is a timing chart of an operation performed when the mode A and the mode B are switched between.

The vehicle controller 31 performs the mode-A mode-B switching process (FIG. 3) for switching between the mode A and the mode B in the second traveling mode. The vehicle controller 31 is capable of switching between the mode A and the mode B in response to the driver operating a mode-A mode-B switch member included in the second-traveling-mode transition switch 45, or automatically in accordance with wheelspin states of the driving wheels 2a and an operation state of the accelerator 41 by the driver.

As illustrated in FIG. 3, in the mode-A mode-B switching process, the vehicle controller 31 determines whether a mode-A mode-B switching condition is satisfied in step S1. The determination processing in step S1 is iterated until the condition is satisfied. If the condition is satisfied, the vehicle controller 31 switches between the mode A and the mode B and also performs change-reducing processing in step S2. In step S2, the driving-force map, the parameters of traction control, the control method of the braking device, and the other control targets are changed in accordance with the selected one of the mode A and the mode B. The change-reducing processing will be described later.

After switching the mode, in step S3, the vehicle controller 31 outputs, to the notification member 46 of the driving operation acceptor 40, information indicating whether the sub-mode of the second traveling mode is the mode A or the mode B so that the information is displayed. The vehicle controller 31 determines whether the vehicle is in traveling backward in step S4. If NO, the process returns to step S1. If the vehicle is traveling backward, the vehicle controller 31 causes the notification member 46 of the driving operation acceptor 40 to output notifying sound indicating switching to the mode A or the mode B in step S5. The process then returns to step S1. The vehicle controller 31 iterates the processing from step S1 again.

According to the mode-A Mode-B switching process described above, when the mode A and the mode B are switched between in the second traveling mode, the driver driving the electric vehicle 1 forward is notified of switching of the mode through switching of indication on the notification member 46. On the other hand, it is difficult to notify the driver driving the electric vehicle 1 backward while looking in the rear direction of switching of the mode with the indication alone. Thus, the notification member 46 outputs notifying sound to notify the driver of switching of the mode. This thus allows the driver to grasp switching between the mode A and the mode B and drive the electric vehicle 1 both in forward traveling and in backward traveling.

The change-reducing processing performed when the sub-mode is switched in step S2 will be described next with reference to a timing chart of FIG. 4. The change-reducing processing is processing for reducing an abrupt change in power caused by a change of the driving-force map when the sub-mode is switched between the mode A and the mode B as indicated by timings t1 and t2 in FIG. 4. A reduction in an abrupt change in power is implemented, for example, by limiting a rate of the change in power with respect to time to an upper-limit value or less or by increasing a time constant of a filter that changes an abrupt temporal change to a gradual temporal change in a calculation process for converting a requested driving force determined based on the driving-force map to an actual driving-force to be actually output.

As illustrated as a change-reducing period in FIG. 4, when switching the sub-mode between the mode A and the mode B in step S2, the vehicle controller 31 performs the change-reducing processing on the power to be output in order to reduce the change in power due to the change in the driving-force map. The vehicle controller 31 makes change-reducing more gradual in backward traveling than in forward traveling. Gradual change-reducing indicates that a rate of change in power with respect to time in the change-reducing period is small.

In backward traveling in the second traveling mode in which a careful accelerator operation is difficult, switching of the sub-mode between the mode A and the mode B may presumably co-occur with an abrupt change in the accelerator operation.

In such a case, through the change-reducing processing described above, the change-reducing in backward traveling is made more gradual than the change-reducing in forward traveling. Thus, even when switching of the sub-mode and an abrupt change in the accelerator operation co-occur, an abrupt change in power is successfully suppressed.

Forward-Traveling Backward-Traveling Switching Process in Second Traveling Mode

Figure 5:
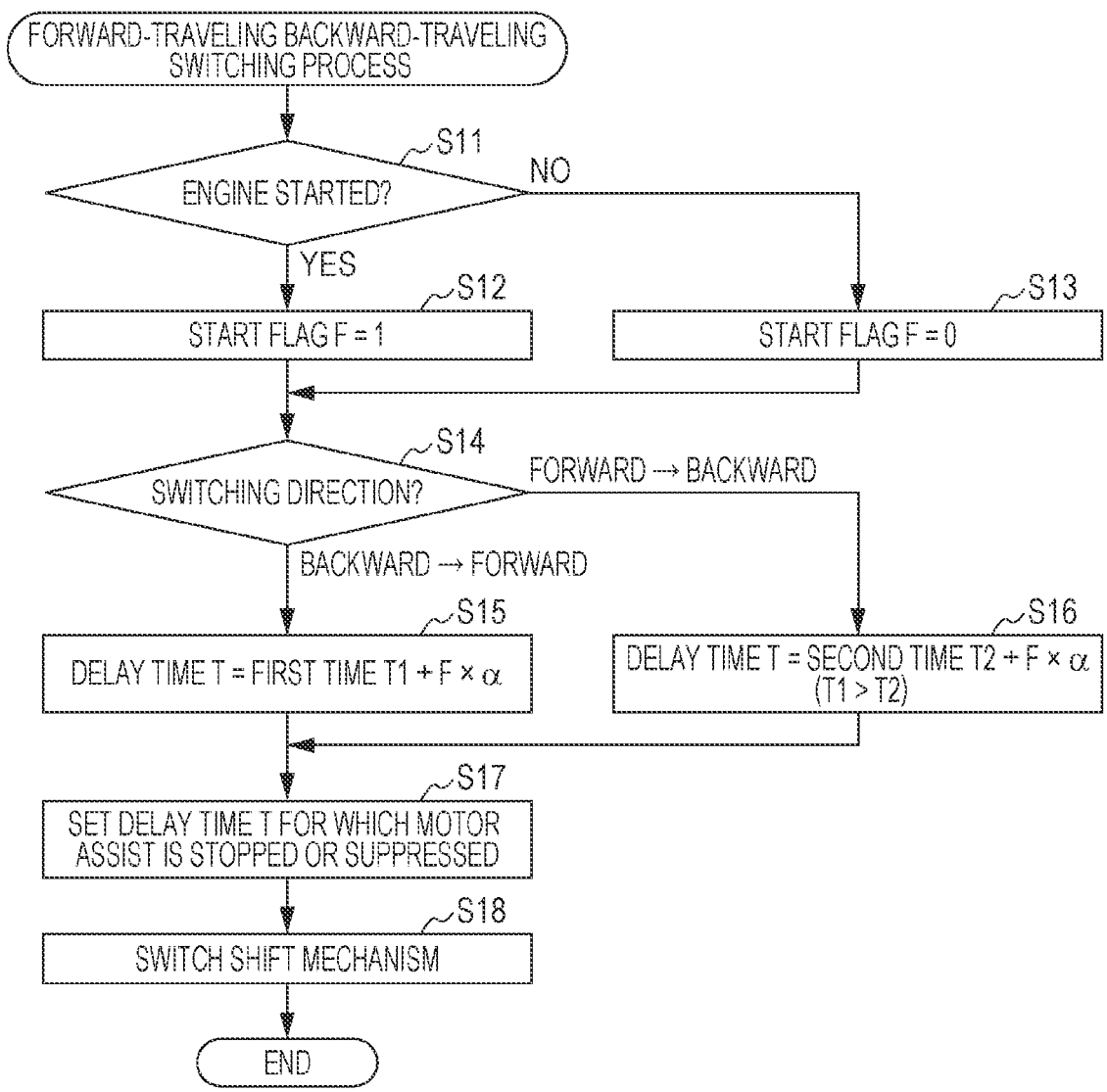
FIG. 5 is a flowchart illustrating a forward-traveling backward-traveling switching process performed by the vehicle controller.

FIG. 5 is a flowchart illustrating a forward-traveling backward-traveling switching process performed by the vehicle controller. An issue to be addressed by the forward-traveling backward-traveling switching process will be described first.

In the second traveling mode (for example, in the second traveling mode A), to implement a sharp increase in power to be output in response to an accelerator operation, power generated by the drive motor 12 having a high responsivity is added to power generated by the engine 11 (hereinafter also referred to as motor assist). The resultant power is output to the driving wheels 2a. The power is output to the driving wheels 2a via the continuously variable transmission 18. If power input to the continuously variable transmission 18 sharply increases, the belt of the continuously variable transmission 18 may slip. Consequently, the power is not successfully transferred in some cases. Accordingly, in the second traveling mode in which a sharp increase in power may occur, pressure of the hydraulic oil is applied to the continuously variable transmission 18 to increase the widths in the input and output pulleys so that the belt is stretched, for example. In this manner, control is performed so that slipping of the belt is suppressed even if there is a sharp increase in power.

On the other hand, when forward traveling and backward traveling are switched between in the second traveling mode, since the engine 11 is operating all the time in the second traveling mode, the shift mechanism 16 is switched and the direction of rotation generated by the power output from the engine 11 is reversed. The shift mechanism 16 is switched by the hydraulic oil, which is shared by the shift mechanism 16 and the continuously variable transmission 18. Thus, switching of the shift mechanism 16 may cause an issue in that pressure of the hydraulic oil for the continuously variable transmission 18 decreases and consequently an effect for suppressing slipping of the belt weakens.

An operation for switching between forward traveling and backward traveling in the second traveling mode is sometimes performed immediately after the traveling mode is switched from the first traveling mode to the second traveling mode. Further, when the electric vehicle 1 is stationary or is EV-traveling in the immediately preceding first traveling mode, there may occur a circumstance in which the engine 11 is not started. EV-traveling indicates that the engine 11 is stopped and the electric vehicle 1 travels by using power generated by the drive motor 12 alone. In such a circumstance, switching between forward traveling and backward traveling in the second traveling mode and starting of the engine 11 are performed concurrently. If the pressure of the hydraulic oil is applied to the continuously variable transmission 18 and slipping of the belt is suppressed when the engine 11 is started, the rotation resistance of the engine 11 increases. This causes an issue in that it becomes difficult to start the engine 11.

The forward-traveling backward-traveling switching process described below with reference to FIG. 5 includes processing for addressing the two issues described above. When a forward-traveling backward-traveling switching request occurs in response to an operation of the selector 44 by a driver in the second traveling mode, the vehicle controller 31 starts the forward-traveling backward-traveling switching process.

In response to the start of the forward-traveling backward-traveling switching process, the vehicle controller 31 determines whether starting of the engine 11 is involved (the engine 11 is yet to be started or the engine 11 is being started) in step S11. If starting of the engine 11 is involved, the vehicle controller 31 sets a start flag F to 1 (F=1) in step S12. If starting of the engine 11 is not involved, the vehicle controller 31 sets the start flag F to 0 (F=0) in step S13. In the second traveling mode, the engine 11 is driven all the time. However, if a shift operation is performed immediately after switching to the second traveling mode, there may be a case where the engine 11 is stopped and it is determined in step S11 that starting of the engine 11 is involved. The processing of starting the engine 11 is performed in the process of switching the travel mode to the second traveling mode that is performed in parallel with the forward-traveling backward-traveling switching process illustrated in FIG. 5.

After setting the start flag F, the vehicle controller 31 determines a direction of switching between forward traveling and backward traveling in step S14. The vehicle controller 31 calculates a delay time T in accordance with the switching direction in step S15 or step S16. In step S17, the vehicle controller 31 sets the calculated delay time T so that the timing when the motor assist is fully permitted is delayed by the delay time T. In step S18, the vehicle controller 31 controls the hydraulic circuit 26 to switch the shift mechanism 16. Setting of the delay for the motor assist in step S17 indicates that the motor assist is stopped or suppressed until the delay time T passes and that output of the drive motor 12 is delayed.

Figure 6:
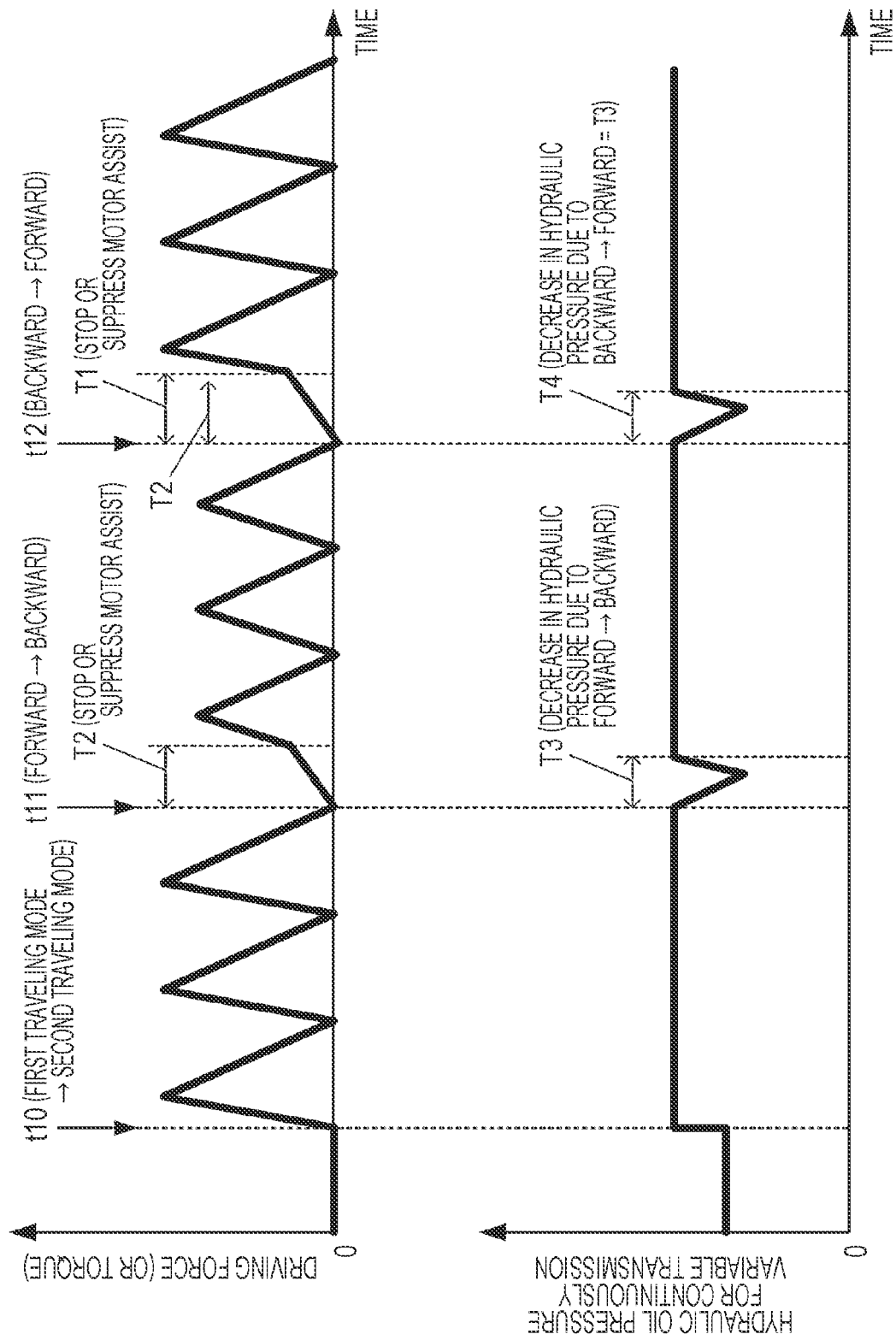
FIG. 6 is a timing chart for describing the forward-traveling backward-traveling switching process.

FIG. 6 is a timing chart for describing the forward-traveling backward-traveling switching process. The timing chart of FIG. 6 illustrates an example in which the driver switches the first traveling mode to the second traveling mode at a timing t10, switches forward traveling to backward traveling at a timing t11, and switches backward traveling to forward traveling at a timing t12. After each of the timings t10, t11, and t12, the driver performs large and small accelerator operations a plurality of times. When the traveling mode is switched from the first traveling mode to the second traveling mode as indicated by the timing t10 in FIG. 6, the hydraulic oil acts on the continuously variable transmission 18, so that control for suppressing slipping of the belt is performed.

At the time of switching of the shift mechanism 16 that is started from the timing t11 or t12, the pressure of the hydraulic oil that acts on the continuously variable transmission 18 temporarily decreases because of the switching operation of the shift mechanism 16. Periods T3 and T4 in which the pressure decreases are substantially constant irrespective of the shift switching direction (forward to backward or backward to forward). If large motor assist is caused to operate in such periods T3 and T4 and power output from the drive motor 12 sharply increases, the belt of the continuously variable transmission 18 may slip because of the decrease in pressure of the hydraulic oil.

However, the delay time T (=T1 or T2) for which the motor assist is stopped or suppressed is set in step S17 of the forward-traveling backward-traveling switching process illustrated in FIG. 5. Consequently, the motor assist is stopped or suppressed in the periods T3 and T4 in which the pressure of the hydraulic oil decreases as indicated by the periods T1 and T2 in FIG. 6, respectively. Thus, slipping of the belt of the continuously variable transmission 18 is successfully avoided in the periods T3 and T4 in which the pressure of the hydraulic oil decreases.

The delay time T for which the motor assist is stopped or suppressed in the case of switching forward traveling to backward traveling is compared with that in the case of switching backward traveling to forward traveling. The driving-force map applied to backward traveling is gentler than the driving-force map applied to forward traveling. Thus, even if the full accelerator operation is performed, an increase rate of power to be output is more gradual after forward traveling is switched to backward traveling than after backward traveling is switched to forward traveling. When the increase rate of power to be output is gradual, slipping of the belt is suppressed even if the decrease in pressure of the hydraulic oil for the continuously variable transmission 18 is not completely addressed. Therefore, in steps S15 and S16 of the forward-traveling backward-traveling switching process illustrated in FIG. 5, the delay time T for which the motor assist is stopped or suppressed is calculated to be shorter in the case where forward traveling is switched to backward traveling than in the case where backward traveling is switched to forward traveling. With such control, the unnecessarily long delay time for which the motor assist is stopped or suppressed is successfully suppressed and highly responsive traveling characteristics of the second traveling mode are successfully implemented.

Figure 7:
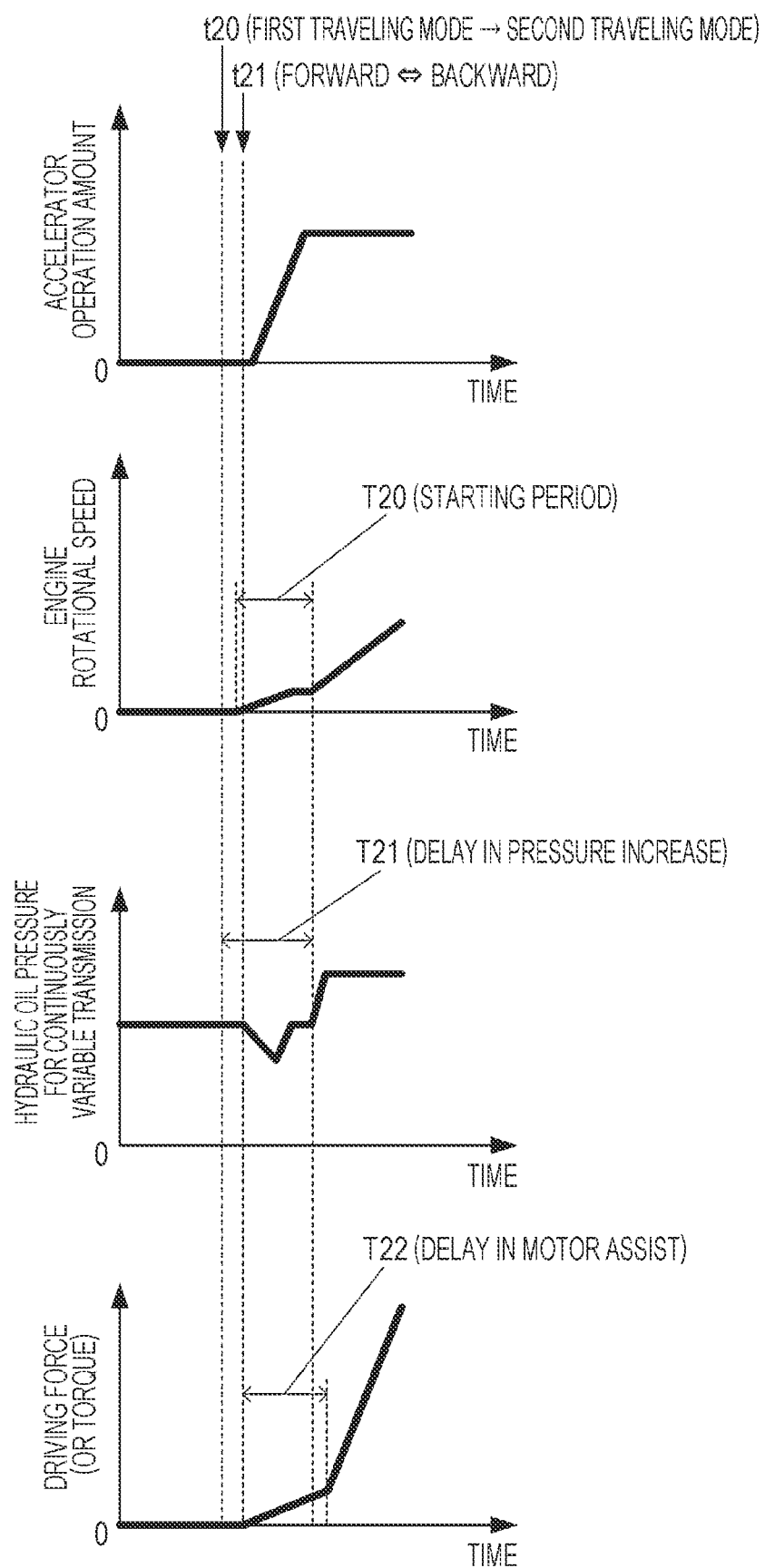
FIG. 7 is a timing chart for describing an operation of the forward-traveling backward-traveling switching process involving starting of an engine.

FIG. 7 is a timing chart for describing an operation of the forward-traveling backward-traveling switching process involving starting of the engine. As described above, if the driver switches the traveling mode to the second traveling mode at a timing t20 and, immediately after the timing t20, performs a shift operation for switching between forward traveling and backward traveling at a timing t21, a starting period T20 of the engine 11 may coincide with a period of the forward-traveling backward-traveling switching process.

In this case, in the process of switching the traveling mode to the second traveling mode, the vehicle controller 31 starts the engine 11 and delays an increase in pressure of the hydraulic oil for the continuously variable transmission 18 for a period T21 to reduce the start resistance of the engine 11. Once the engine 11 is started, the vehicle controller 31 increases the pressure of the hydraulic oil for the continuously variable transmission 18 to suppress slipping of the belt of the continuously variable transmission 18.

On the other hand, in the forward-traveling backward-traveling switching process, when the delay time T for which the motor assist is stopped or suppressed is calculated in step S15 or S16, the vehicle controller 31 adds a time "F×α" corresponding to the starting of the engine 11 if the engine is started in the delay time T. Thus, the time for which the pressure of the hydraulic oil decreases and the time for which slipping of the belt of the continuously variable transmission 18 is unable to be suppressed increase owing to the starting of the engine 11. The delay time T increases in accordance with this increase. Accordingly, even if the driver performs a hard accelerator operation after the shift operation, the motor assist is stopped or suppressed for the delay time T (delay time T22 in FIG. 7) set to be longer in accordance with the starting of the engine 11. Thus, slipping of the belt of the continuously variable transmission 18 is successfully avoided in the second traveling mode.

As described above, in the second traveling mode, the electric vehicle 1 according to the embodiment applies a gentler driving-force map to backward traveling than that applied to forward traveling. As a result of a gentle driving-force map being applied to backward traveling in the second traveling mode in which driving is difficult and thus a careful accelerator operation becomes difficult, the power to be output is equalized in forward traveling and in backward traveling when the driver performs an accelerator operation so that similar power is output. Therefore, good traveling characteristics in the second traveling mode for enhancing the rough-road capability are successfully be provided.

Further, the electric vehicle 1 according to the embodiment delays output of the drive motor 12 by the delay time T in response to switching between forward traveling and backward traveling in the second traveling mode. Switching of the shift mechanism 16 causes a decrease in the pressure of the hydraulic oil. Consequently, the belt of the continuously variable transmission 18 is more likely to slip. With the configuration described above, a sharp increase in power to be output from the drive motor 12 is successfully avoided and slipping of the belt is successfully suppressed by setting the delay time T in a circumstance in which the belt is more likely to slip. Therefore, good traveling characteristics are successfully provided in the second traveling mode.

Further, in the electric vehicle 1 according to the embodiment, the delay time T is set shorter when forward traveling is switched to backward traveling than when backward traveling is switched to forward traveling.

Thus, in accordance with the direction of switching between forward traveling and backward traveling, an unnecessarily long delay of the output of the drive motor 12 is successfully avoided and highly responsive traveling characteristics of the second traveling mode are successfully implemented.

Further, in the electric vehicle 1 according to the embodiment, the delay time T is set longer if switching between forward traveling and backward traveling involves starting of the engine in the second traveling mode. Thus, an increase in pressure of the hydraulic oil is successfully suppressed during the start of the engine 11 to allow the engine 11 to be started with a small resistance. Also, by delaying the output of the drive motor 12 for the delay time T, slipping of the belt of the continuously variable transmission 18 due to a decrease in pressure of the hydraulic oil is successfully suppressed. Therefore, good traveling characteristics are successfully provided in the second traveling mode.

Further, the electric vehicle 1 according to the embodiment makes a reduction in a change in power output to the driving wheels 2a in response to switching between the mode A and the mode B in the second traveling mode be performed more gradually in backward traveling than in forward traveling. In backward traveling in the second traveling mode in which a careful accelerator operation is difficult, even in a case where switching of the sub-mode between the mode A and the mode B coincides with an abrupt change in the accelerator operation, the change is reduced gradually in backward traveling. Thus, an abrupt change in power is successfully suppressed. Therefore, good traveling characteristics are successfully provided in the second traveling mode.

The embodiment of the disclosure has been described above. However, the disclosure is not limited to the embodiment described above. For example, in the embodiment described above, an example has been described in which power generated by the engine 11 and power generated by the drive motor 12 are transferred via the continuously variable transmission 18. Alternatively, power generated by the drive motor 12 alone may be transferred to the driving wheels 2a via the continuously variable transmission 18 and power generated by the engine 11 may be transferred to the driving wheels 2a through another path. In the embodiment, examples of the driving-force maps and the response characteristics in the second traveling mode have been described. However, the illustrated examples are merely simplified driving-force maps and response characteristics, and thus actual driving-force maps and response characteristics may be modified variously. The power or driving force output to the driving wheels is proportional to torque output to the driving wheels. Thus, the power in the description of the embodiment may be read as torque. In addition, details in the embodiment may be appropriately modified within a scope not departing from the gist of the disclosure.

The visibility of the driver impairs in backward traveling compared with forward traveling. As a result, the driver may find it difficult to drive because the driver moves their sight in the rear direction and is consequently in an uncomfortable position for driving. Thus, a careful accelerator operation becomes difficult. On the other hand, according to the embodiment of the disclosure, a driving-force map with gentler characteristics is applied to backward traveling than that applied to forward traveling in the second traveling mode for enhancing the rough-road capability. Therefore, a gentle driving-force map is applied for a less careful accelerator operation in backward traveling, whereas a sharp driving-force map is applied for a careful accelerator operation in forward traveling. In this manner, the power to be output in response to an accelerator operation is substantially equalized in forward traveling and in backward traveling. Consequently, good traveling characteristics with an enhanced rough-road capability are provided both in forward traveling and in backward traveling.

The vehicle controller 31 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle controller 31. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An electric vehicle comprising:
   a vehicle controller configured to switch a traveling mode of the electric vehicle between a first traveling mode and a second traveling mode that applies driving-force maps for enhancing a rough-road capability from a rough-road capability in the first traveling mode,
   wherein the driving-force maps of the second traveling mode includes a first driving-force map to be used when the electric vehicle moves in forward traveling and a second driving-force map to be used when the electric vehicle in backward traveling,
   wherein driving force to be generated based on the first driving-force map is greater than driving force to be generated based on the second driving-force map in relation to an amount of an accelerator operation,
   wherein the vehicle controller is further configured to:
      when the traveling mode is switched to the second traveling mode and the electric vehicle in the forward traveling, control the electric vehicle based on the first driving-force map; and
      when the traveling mode is switched to the second traveling mode and the electric vehicle in the backward traveling, control the electric vehicle based on the second driving-force map,
   wherein the electric vehicle further comprises:
      an engine configured to drive a driving wheel;
      a drive motor configured to drive the driving wheel; and
      a continuously variable transmission configured to transfer power generated by the drive motor to the driving wheel,
   wherein the second traveling mode allows outputting of power generated by the engine alone to the drive wheel or both the outputting of the power generated by the engine and outputting of the power generated by the drive motor to the drive wheel,
   wherein the vehicle controller is configured to apply a delay to the outputting of the power generated by the drive motor in response to switching between the forward traveling and the backward traveling in the second traveling mode, and
   wherein the delay applied in response to switching of forward traveling to backward traveling in the second traveling mode is shorter than the delay applied in response to switching of backward traveling to forward traveling in the second traveling mode.

2. The electric vehicle according to claim 1, wherein in response to co-occurrence of starting of the engine and switching between forward traveling and backward traveling in the second traveling mode, the vehicle controller increases the delay.

3. The electric vehicle according to claim 2,
   wherein the second traveling mode includes a sub-mode A in which wheelspin of the driving wheel is permitted, and a sub-mode B in which wheelspin of the driving wheel is suppressed, and
   wherein the vehicle controller is configured to reduce a power change that occurs in response to switching between the sub-mode A and the sub-mode B more gradually in the backward traveling than in the forward traveling.

4. The electric vehicle according to claim 1,
   wherein the second traveling mode includes a sub-mode A in which wheelspin of the driving wheel is permitted, and a sub-mode B in which wheelspin of the driving wheel is suppressed, and
   wherein the vehicle controller is configured to reduce a power change that occurs in response to switching between the sub-mode A and the sub-mode B more gradually in the backward traveling than in the forward traveling.

5. An electric vehicle comprising:
   circuitry configured to switch a traveling mode of the electric vehicle between a first traveling mode and a second traveling mode that applies driving-force maps for enhancing a rough-road capability from a rough-road capability in the first traveling mode,
   wherein the driving-force maps of the second traveling mode includes a first driving-force map to be used when the electric vehicle moves in forward traveling and a second driving-force map to be used when the electric vehicle in backward traveling,
   wherein driving force to be generated based on the first driving-force map is greater than driving force to be generated based on the second driving-force map in relation to an amount of an accelerator operation, and
   an accelerator response based on the first driving-force map is quicker than an accelerator response based on the second driving-force map, and
   wherein the circuitry is further configured to:
      when the traveling mode is switched to the second traveling mode and the electric vehicle in the forward traveling, control the electric vehicle based on the first driving-force map; and when the traveling mode is switched to the second traveling mode and the electric vehicle in the backward traveling, control the electric vehicle based on the second driving-force map,
wherein the electric vehicle further comprises:
an engine configured to drive a driving wheel;
a drive motor configured to drive the driving wheel; and
a continuously variable transmission configured to transfer power generated by the drive motor to the driving wheel,
wherein the second traveling mode allows outputting of power generated by the engine alone to the drive wheel or both the outputting of the power generated by the engine and outputting of the power generated by the drive motor to the drive wheel,
wherein the circuitry is configured to apply a delay to the outputting of the power generated by the drive motor in response to switching between the forward traveling and the backward traveling in the second traveling mode, and
wherein the delay applied in response to switching of forward traveling to backward traveling in the second traveling mode is shorter than the delay applied in response to switching of backward traveling to forward traveling in the second traveling mode.

6. An electric vehicle comprising:
a vehicle controller configured to switch a traveling mode of the electric vehicle between a first traveling mode and a second traveling mode that applies driving-force maps for enhancing a rough-road capability from a rough-road capability in the first traveling mode,
wherein the driving-force maps of the second traveling mode includes a first driving-force map to be used when the electric vehicle moves in forward traveling and a second driving-force map to be used when the electric vehicle in backward traveling,
wherein driving force to be generated based on the first driving-force map is greater than driving force to be generated based on the second driving-force map in relation to an amount of an accelerator operation,
wherein the vehicle controller is further configured to:
when the traveling mode is switched to the second traveling mode and the electric vehicle in the forward traveling, control the electric vehicle based on the first driving-force map; and
when the traveling mode is switched to the second traveling mode and the electric vehicle in the backward traveling, control the electric vehicle based on the second driving-force map,
wherein the electric vehicle further comprises:
an engine configured to drive a driving wheel;
a drive motor configured to drive the driving wheel; and
a continuously variable transmission configured to transfer power generated by the drive motor to the driving wheel,
wherein the second traveling mode allows outputting of power generated by the engine alone to the drive wheel or both the outputting of the power generated by the engine and outputting of the power generated by the drive motor to the drive wheel,
wherein the vehicle controller is configured to apply a delay to the outputting of the power generated by the drive motor in response to switching between the forward traveling and the backward traveling in the second traveling mode, and
wherein in response to co-occurrence of starting of the engine and switching between forward traveling and backward traveling in the second traveling mode, the vehicle controller increases the delay.

* * * * *